(12) United States Patent
Luo et al.

(10) Patent No.: US 12,354,344 B2
(45) Date of Patent: Jul. 8, 2025

(54) APPARATUS AND METHOD FOR PERFORMING IMAGE-BASED DISH RECOGNITION (71) Applicant: KONINKLIJKE PHILIPS N.V., Eindhoven (NL)

(72) Inventors: Zhongchi Luo, Eindhoven (NL); Weimin Xiao, Eindhoven (NL); Linjun Li, Eindhoven (NL); Yafang Jin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 698 days.

(21) Appl. No.: 17/598,771

(22) PCT Filed: Mar. 20, 2020

(86) PCT No.: PCT/EP2020/057733
§ 371 (c)(1),
(2) Date: Sep. 27, 2021

(87) PCT Pub. No.: WO2020/193391
PCT Pub. Date: Oct. 1, 2020

(65) Prior Publication Data
US 2022/0172008 A1    Jun. 2, 2022

(30) Foreign Application Priority Data

Mar. 28, 2019  (WO) ............... PCT/CN2019/080016
May 2, 2019    (EP) .................................... 19172163

(51) Int. Cl.
G06V 10/774    (2022.01)
G06F 18/22     (2023.01)
(Continued)

(52) U.S. Cl.
CPC .............. *G06V 20/00* (2022.01); *G06F 18/22* (2023.01); *G06F 18/24137* (2023.01);
(Continued)

(58) Field of Classification Search
CPC .... G06V 20/00; G06V 10/761; G06V 10/764; G06V 10/774; G06V 10/82; G06V 20/68; G06F 18/22; G06F 18/24137
See application file for complete search history.

(56) References Cited

U.S. PATENT DOCUMENTS 9,483,547 B1   11/2016  Feller et al.
9,928,448 B1    3/2018  Merler et al.
(Continued)

FOREIGN PATENT DOCUMENTS

CN   102576372 A   7/2012
CN   103942569 A   7/2014
(Continued)

OTHER PUBLICATIONS

Chen, J., et al., "Deep-based Ingredient Recognition for Cooking Recipe Retrieval", pp. 1-10, 2016.
(Continued)

Primary Examiner — Marcos L Torres
(74) Attorney, Agent, or Firm — Maschoff Brennan (57) ABSTRACT There is provided a computer-implemented method for performing image-based dish recognition. The method includes acquiring a first image depicting a dish to be recognized, analyzing the first image using a predictive model to determine a first candidate theme, and acquiring a reference set of dish identifiers. The method further includes calculating, for each of the dish identifiers in the reference set, an association score indicative of a degree of similarity between the dish represented by the respective dish identifier and the first candidate theme, selecting one or more dish
(Continued)

identifiers in the reference set having the highest association scores as one or more variant dish identifiers of the first candidate theme, and outputting a centroid dish identifier of the first candidate theme and the one or more variant dish identifiers of the first candidate theme.

17 Claims, 3 Drawing Sheets

(51) Int. Cl.
*G06F 18/2413* (2023.01)
*G06V 10/74* (2022.01)
*G06V 10/764* (2022.01)
*G06V 10/82* (2022.01)
*G06V 20/00* (2022.01)
*G06V 20/68* (2022.01)

(52) U.S. Cl.
CPC .......... *G06V 10/761* (2022.01); *G06V 10/764* (2022.01); *G06V 10/774* (2022.01); *G06V 10/82* (2022.01); *G06V 20/68* (2022.01)

(56) References Cited

U.S. PATENT DOCUMENTS

| 11,080,742 | B1* | 8/2021 | Iannone | G06F 9/547 |
|---|---|---|---|---|
| 2015/0170001 | A1 | 6/2015 | Rabinovich et al. | |
| 2016/0063692 | A1 | 3/2016 | Divakaran et al. | |
| 2016/0063734 | A1* | 3/2016 | Divakaran | G06V 10/50 |
| | | | | 382/110 |
| 2016/0335588 | A1 | 11/2016 | Knobel | |
| 2018/0157936 | A1* | 6/2018 | Lee | G06V 10/764 |
| 2018/0308143 | A1* | 10/2018 | Chan | G06Q 30/0623 |
| 2019/0034556 | A1* | 1/2019 | Gu | G01N 33/02 |
| 2019/0304000 | A1* | 10/2019 | Simpson | G16B 40/00 |

FOREIGN PATENT DOCUMENTS

| CN | 107851183 | A | 3/2018 |
|---|---|---|---|
| CN | 108027912 | A | 5/2018 |
| CN | 108463821 | A | 8/2018 |
| CN | 109074861 | A | 12/2018 |
| EP | 3306543 | A1 | 4/2018 |
| KR | 20170092364 | A | 8/2017 |

OTHER PUBLICATIONS

Salvador, A., et al., "Learning Cross-Modal Embeddings for Cooking Recipes and Food Images", IEEE Conference on Computer Vision and Pattern Recognition, IEEE Computer Society, pp. 3068-3076, Jul. 21, 2017.

Herranz, L., et al., "Food recognition and recipe analysis: integrating visual content, context and external knowledge", Cornell University Library, pp. 1-7, Jan. 22, 2018.

Mezgec, S., et al., "Mixed deep learning and natural language processing method for fake-food image recognition and standardization to help automated dietary assessment", Public Health Nutrition, pp. 1-10, Feb. 27, 2018.

Extended European Search Report issued in connection with corresponding EP Application No. 19172163.8 dated Oct. 24, 2019.

International Search Report and Written Opinion issued in connection with corresponding PCT Application No. PCT/EP2020/057733 dated Jul. 1, 2020.

\* cited by examiner

| | The food in the picture may be: | | |
|---|---|---|---|
| | Name | Rank | |
| 31 — | Candidate Theme A | 1 | ▽ |
| 32 — | Candidate Theme B | 2 | ▽ |
| 33 — | Candidate Theme C | 3 | ▽ |
| 34 — | Candidate Theme D | 4 | ▽ |

Fig. 3A

| | The food in the picture may be: | | |
|---|---|---|---|
| | Name | Rank | |
| 31 — | Candidate Theme A | 1 | △ |
| 310 — | -- Theme Centroid A-0 | 1-0 | |
| 311 — | -- Candidate Variant A-1 | 1-1 | |
| 312 — | -- Candidate Variant A-2 | 1-2 | |
| 313 — | -- Candidate Variant A-3 | 1-3 | |
| 314 — | -- Candidate Variant A-4 | 1-4 | |
| 32 — | Candidate Theme B | 2 | ▽ |
| 33 — | Candidate Theme C | 3 | ▽ |
| 34 — | Candidate Theme D | 4 | ▽ |

Fig. 3B

APPARATUS AND METHOD FOR PERFORMING IMAGE-BASED DISH RECOGNITION

CROSS-REFERENCE TO RELATED APPLICATIONS

The present application is a U.S. National Phase application under 35 U.S.C. § 371 of International Application No. PCT/EP2020/057733, filed on Mar. 20, 2020, which claims the benefit of European Patent Application No. 19172163.8, filed on May 2, 2019, and International Application No. PCT/CN2019/080016, filed on Mar. 28, 2019. These applications are hereby incorporated by reference herein.

FIELD OF THE INVENTION

The present disclosure relates to an apparatus and method for performing image-based dish recognition.

BACKGROUND OF THE INVENTION

There are many diet logging systems currently available in the market for monitoring nutritional intake of individuals. These systems typically rely on receiving user input to record the food consumed, and this process requires a great deal of human interaction as well as a certain degree of ability and will power from users. In order to achieve a desired level of effectiveness, the user has to record consumed dishes accurately and persistently.

SUMMARY OF THE INVENTION

As noted above, users of diet logging systems are required to input and/or record the dishes they have consumed in an accurate and persistent manner. It is therefore important to provide a logging tool that is user-friendly and intuitive so as to improve the likelihood of the users' ability to adhere to the habit of inputting and/or recording the consumed food on a daily basis. One of the key factors for achieving user-friendliness and intuitiveness is the ability of the system to correctly respond to the user's intention within a minimum amount of user interaction steps.

To this end, machine learning and deep learning processes can be utilized to improve understanding of a user's intention while reducing an amount of intervention required from the user to input and/or record dishes. Although machine learning processes such as those involving neural networks can be used for extracting patterns that are common within a class and distinctive from other classes from a large amount of labelled training data, for many food items such as dishes in Chinese cuisine, the lack of a clear-cut definition or specification associated with the food item may lead to issues in class specification. For example, some dishes may consist of similar food ingredients and/or have similar appearances but with different names, and some dishes with similar names may have distinctly different food ingredients. For this reason, it is often difficult to specify a set of mutually exclusive classes at fine granularity and to collect exemplary data on the basis of such set. Overlapping between class definition or de facto in training data may lead to confusion in machine learning and result in inaccurate classification which, during use, may cause frustration to the users. However, if classes were to be defined distantly apart and only highly representative data is collected so as to avoid overlapping, this will lead to a high specificity but a low sensitivity in dish recognition—this is undesirable because the system would be unsuitable for recognizing the rich variety of real-life dishes. Hence, it would be advantageous to provide a user-friendly image-based dish recognition method which can accurately recognize user input (i.e. high recall rate) and is also capable of responding to a variance in the user input (i.e. high specificity).

To better address one or more of the concerns mentioned earlier, in a first aspect, a computer-implemented method for performing image-based dish recognition is provided. The method comprises: acquiring a first image depicting a dish to be recognized; analyzing the first image using a predictive model to determine a first candidate theme, wherein the first candidate theme comprises a plurality of candidate dish identifiers each associated with a candidate dish, one of the candidate dish identifiers being a centroid dish identifier associated with a candidate dish most representative of the first candidate theme; acquiring a reference set of dish identifiers; calculating, for each of the dish identifiers in the reference set, an association score indicative of a degree of similarity between the dish represented by the respective dish identifier and the first candidate theme; selecting one or more dish identifiers in the reference set having the highest association scores as one or more variant dish identifiers of the first candidate theme; and outputting the centroid dish identifier of the first candidate theme and the one or more variant dish identifiers of the first candidate theme In some embodiments, outputting the centroid dish identifier of the first candidate theme and the one or more variant dish identifiers of the first candidate theme comprises: displaying first candidate theme; and displaying, upon receiving a user input to expand the first candidate theme, the centroid dish identifier of the first candidate theme and the one or more variant dish identifiers of the first candidate theme. In these embodiments, the centroid dish identifier of the first candidate theme may be displayed above the one or more variant dish identifiers of the first candidate theme, and the one or more variant dish identifiers of the first candidate theme may be displayed in descending order of their respective association scores.

In some embodiments, the plurality of candidate dish identifiers in the first candidate theme may represent dishes that are similar to each other.

In some embodiments, the method may further comprise: analyzing the first image using a predictive model to determine one or more additional candidate themes. In these embodiments, each of the additional candidate themes may comprise a plurality of candidate dish identifiers each associated with a candidate dish, one of the candidate dish identifiers being a centroid dish identifier most representative of the respective candidate theme. Furthermore, the method may further comprise outputting the one or more additional candidate themes.

In some embodiments, the method may further comprise performing, for each of the one or more additional candidate themes, the following method steps: calculating, for each of the dish identifiers in the reference set, an association score indicative of a degree of similarity between the dish represented by the respective dish identifier and the respective additional candidate theme; selecting one or more dish identifiers in the reference set having the highest association scores as one or more variant dish identifiers of the respective additional candidate theme; and outputting the centroid dish identifier of the respective additional candidate theme and the one or more variant dish identifiers of the respective additional candidate theme.

In some embodiments, the method may further comprise determining a ranking of the first candidate theme and the one or more additional candidate themes using the predictive model. In these embodiments, the ranking may be indicative of a descending degree of similarity between the centroid dish of the respective candidate theme and the depicted dish in the acquired first image. The method may further comprise displaying the first candidate theme and the one or more additional candidate themes based on the determined ranking.

In some embodiments, the method may further comprise: acquiring a plurality of recipes, wherein each of the plurality of recipes comprises: a dish identifier, a plurality of food ingredients, and one or more cooking instructions; selecting a core subset of recipes from the acquired plurality of recipes; calculating a similarity score between each of the recipes in the core subset based on at least one of: a degree of similarity between the dish identifiers of the two recipes, a degree of similarity between the food ingredients of the two recipes, and a degree of similarity between the cooking instructions of the two recipes; clustering the plurality of recipes into a plurality of reference themes based on the similarity scores of the plurality of recipes; and selecting, for each of the plurality of reference themes, the recipe having the highest cosine similarity with the respective reference theme as the centroid recipe, wherein the dish identifier of the selected recipe is the centroid dish identifier of the respective reference theme. In these embodiments, determining a first candidate theme may comprise selecting the first candidate theme from the plurality of reference themes.

In some embodiments, the method may further comprise determining a popularity score for each of the plurality of recipes, wherein the popularity score is indicative of a popularity or commonness of the respective recipe. In these embodiments, selecting the core subset of recipes may be based on the popularity scores of the plurality of recipes.

In some embodiments, calculating the similarity score between each of the recipes in the core subset may be based on one or more synonyms of at least one of: the dish identifiers, the plurality of food ingredients, and the cooking instructions of the two recipes.

In some embodiments, clustering the plurality of recipes into a plurality of reference themes may be based on K-means clustering or singular value decomposition.

In some embodiments, the method may further comprise determining, for each of the plurality of reference themes, a plurality of keywords based on the recipes of the respective reference themes. In these embodiments, each of the plurality of keywords is associated with at least one of a cooking technique and a food ingredient;

In some embodiments, the method may further comprise: selecting one of the plurality of reference themes; acquiring a second image based on at least one of the centroid dish identifier of the selected reference theme and the plurality of keywords of the selected reference theme; and training the predictive model based on the second image and the selected reference theme.

In some embodiments, the predictive model may be at least one of: a convolutional neural network, a residual neural network, and a dense neural network.

In a second aspect, a computer program product comprising a computer readable medium is provided. The computer readable medium has computer readable code embodied therein, the computer readable code being configured such that, on execution by a suitable computer or processor, the computer or processor is caused to perform the method as described herein.

In a third aspect, an apparatus for performing image-based dish recognition is provided. The apparatus comprises a processor configured to: acquire a first image depicting a dish to be recognized; analyze the first image using a predictive model to determine a first candidate theme, wherein the first candidate theme comprises a plurality of candidate dish identifiers each associated with a candidate dish, one of the candidate dish identifiers being a centroid dish identifier associated with a candidate dish most representative of the first candidate theme; acquire a reference set of dish identifiers; calculate, for each of the dish identifiers in the reference set, an association score indicative of a degree of similarity between the dish represented by the respective dish identifier and the first candidate theme; select one or more dish identifiers in the reference set having the highest association scores as one or more variant dish identifiers of the first candidate theme; and output the centroid dish identifier of the first candidate theme and the one or more variant dish identifiers of the first candidate theme.

According to the aspects and embodiments described above, the limitations of existing techniques are addressed. In particular, the above-described aspects and embodiments enable a high recall rate in image-based dish recognition as well as a high specificity. The embodiments described above attain the high sensitivity by performing image recognition at a coarse (e.g. thematic) granularity and the high specificity by performing natural language processing (NLP) based variant search for theme(s).

There is thus provided an improved method and apparatus for performing image-based dish recognition. These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF EMBODIMENTS

As noted above, there is provided an improved apparatus and a method of operating the same which addresses the existing problems.

Figure 1:
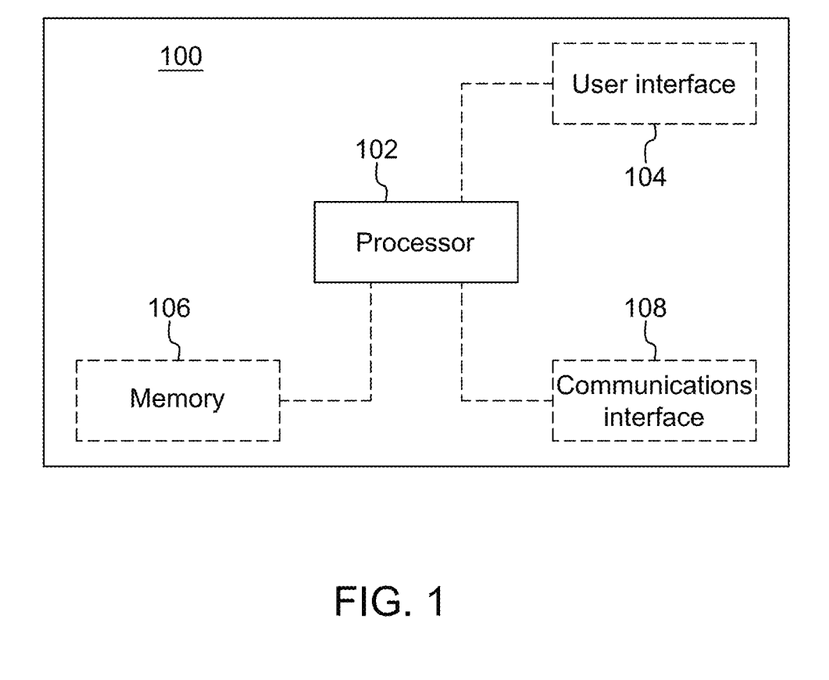
FIG. 1 is a block diagram of an apparatus for performing image-based dish recognition according to an embodiment.

FIG. 1 shows a block diagram of an apparatus 100 according to an embodiment, which can be used for performing image-based dish recognition. Although the operation of the apparatus 100 is described below in the context of performing dish recognition for a single image, it will be appreciated that the apparatus 100 is capable of performing image-based dish recognition for each of a plurality of images.

As illustrated in FIG. 1, the apparatus comprises a processor 102 that controls the operation of the apparatus 100 and that can implement the method described herein. The processor 102 can comprise one or more processors, processing units, multi-core processor or modules that are configured or programmed to control the apparatus 100 in the manner described herein. In particular implementations, the processor 102 can comprise a plurality of software and/or hardware modules that are each configured to perform, or are for performing, individual or multiple steps of the method described herein.

Briefly, the processor 102 is configured to acquire a first image depicting a dish to be recognized, and to analyze the first image using a predictive model to determine a first candidate theme. The first candidate theme comprises a plurality of dish identifiers each associated with a candidate dish, and one of the candidate dish identifiers is a centroid dish identifier associated with a candidate dish most representative of the first candidate theme.

The processor 102 is further configured to acquire a reference set of dish identifiers, and to calculate, for each of the dish identifiers in the reference set, an association score indicative of a degree of similarity between the dish represented by the respective dish identifier and the first candidate theme. Subsequently, the processor 102 is configured to select one or more dish identifiers in the reference set having the highest association scores as one or more variant dish identifiers of the first candidate theme, and to output the centroid dish identifier of the first candidate theme and the one or more variant dish identifiers of the first candidate theme.

In some embodiments, the apparatus 100 may further comprise at least one user interface 104. Alternative or in addition, at least one user interface 104 may be external to (i.e. separate to or remote from) the apparatus 100. For example, at least one user interface 104 may be part of another device. A user interface 104 may be for use in providing a user of the apparatus 100 with information resulting from the method described herein. Alternatively or in addition, a user interface 104 may be configured to receive a user input. For example, a user interface 104 may allow a user of the apparatus 100 to manually enter instructions, data, or information. In these embodiments, the processor 102 may be configured to acquire the user input from one or more user interfaces 104.

A user interface 104 may be any user interface that enables the rendering (or output or display) of information to a user of the apparatus 100. Alternatively or in addition, a user interface 104 may be any user interface that enables a user of the apparatus 100 to provide a user input, interact with and/or control the apparatus 100. For example, the user interface 104 may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, the apparatus 100 may comprise a memory 106. Alternatively or in addition, one or more memories 106 may be external to (i.e. separate to or remote from) the apparatus 100. For example, one or more memories 106 may be part of another device. A memory 106 can be configured to store program code that can be executed by the processor 102 to perform the method described herein. A memory can be used to store information, data, signals and measurements acquired or made by the processor 102 of the apparatus 100. For example, a memory 106 may be used to store (for example, in a local file) the reference set of dish identifiers. The processor 102 may be configured to control a memory 106 to store the reference set of dish identifiers.

In some embodiments, the apparatus 100 may comprise a communications interface (or circuitry) 108 for enabling the apparatus 100 to communicate with any interfaces, memories and/or devices that are internal or external to the apparatus 100. The communications interface 108 may communicate with any interfaces, memories and/or devices wirelessly or via a wired connection. For example, the communications interface 108 may communicate with one or more user interfaces 104 wirelessly or via a wired connection. Similarly, the communications interface 108 may communicate with the one or more memories 106 wirelessly or via a wired connection.

It will be appreciated that FIG. 1 only shows the components required to illustrate an aspect of the apparatus 100 and, in a practical implementation, the apparatus 100 may comprise alternative or additional components to those shown.

Figure 2:
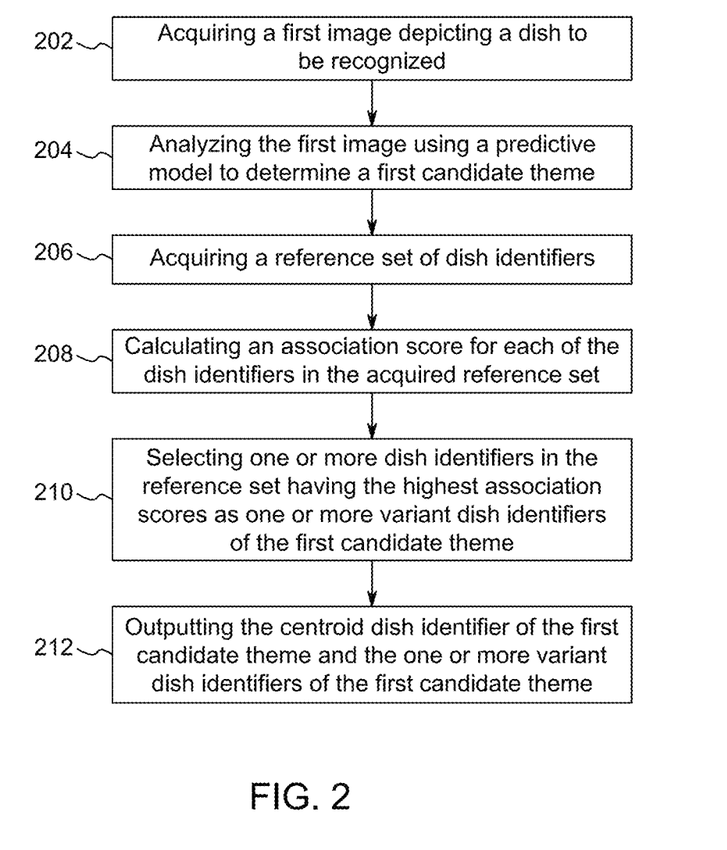
FIG. 2 illustrates a method for performing image-based dish recognition according to an embodiment.

FIG. 2 illustrates a computer-implemented method for performing image-based dish recognition according to an embodiment. The illustrated method can generally be performed by or under the control of processor 102 of the apparatus 100.

With reference to FIG. 2, at block 202, a first image depicting a dish to be recognized is acquired. More specifically, the first image may be acquired by the processor 102 of the apparatus 100. The first image may be acquired from the memory 106 of the apparatus 100 or from an external memory or database. For example, the first image may be acquired from a memory of an imaging device (e.g. a camera) external to the apparatus 100. A user can take a photograph of a dish before consumption which can then be communicated to the processor 102 of the apparatus 100 for performing dish recognition.

Returning to FIG. 2, at block 204, the first image acquired at block 202 is analyzed, using a predictive model, to determine a first candidate theme. More specifically, the first image may be acquired by the processor 102 of the apparatus 100. The first candidate theme comprises a plurality of candidate dish identifiers each associated with a candidate dish, one of the candidate dish identifiers being a centroid dish identifier associated with a candidate dish most representative of the first candidate theme. In some embodiments, the plurality of candidate dish identifiers in the first candidate theme may present dishes that are similar to each other. In some embodiments, the predictive model may be at least one of: a convolutional neural network, a residual neural network, and a dense neural network.

As will be explained in further detail below, determination of the first candidate theme at block 204 may comprise selecting, using the predictive model, the first candidate theme from a plurality of reference themes. In more detail, amongst the plurality of reference themes, the processor 102 may be configured to select a theme with candidate dishes that are most likely to be the dish depicted in the first image. Additionally or alternatively, the processor 102 may be configured to select a theme with a centroid dish that is most likely to be the dish depicted in the first image.

Returning to FIG. 2, at block 206, a reference set of dish identifiers is acquired. More specifically, the reference set of dish identifiers may be acquired by the processor 102 of the apparatus 100. As will be explained in more detail, in some embodiments the method may further comprise the step of acquiring a plurality of recipes, wherein each of the plurality of recipes comprises: a dish identifier, a plurality of food ingredients, and one or more cooking instructions. In these embodiments, the reference set of dish identifiers may be acquired from the plurality of acquired recipes, i.e. extracting the dish identifiers from at least some of the acquired recipes.

Returning to FIG. 2, at block 208, an association score is calculated for each of the dish identifiers in the reference set acquired at block 206. More specifically, an association score for each of the dish identifiers in the reference set may be calculated by the processor 102 of the apparatus 100. The association score of a dish identifier is indicative of a degree of similarity between the dish represented by the respective dish identifier and the first candidate theme.

In some embodiments, the association score for each of the dish identifiers in the reference set may be calculated based on cosine similarity metrics. In these embodiments, the method may further comprise determining a vector for each of the dish identifiers in the reference set based on a relevant occurrence frequency of one or more semantic keywords (e.g. dish identifier itself and its aliases/synonyms, food ingredients, and instructions) in a recipe associated with the respective dish identifier. The method may also comprise determining a vector for the first candidate theme based on a relevant occurrence frequency of the same one or more semantic keywords in the recipes associated with the candidate dish identifiers in the first candidate theme. Alternatively, the method may comprise determining a vector for the first candidate theme based on a relevant occurrence frequency of the same one or more semantic keywords in the recipe associated with the centroid dish identifier in the first candidate theme.

Accordingly, the degree of similarity between the dish represented by the respective dish identifier and the first candidate theme may be calculated based on a proximity distance between the vector of the respective dish identifier in the reference set and the vector of the first candidate theme, or based on an angle between the vector of the respective dish identifier in the reference set and the vector of the first candidate theme.

Returning to FIG. 2, at block 210, one or more dish identifiers in the reference set having the highest association scores are selected as one or more variant dish identifiers of the first candidate theme. More specifically, the one or more dish identifiers in the reference set having the highest associated scores may be selected by the processor 102 of the apparatus 100 as the one or more variant dish identifiers of the first candidate theme.

In some embodiments, selection of the one or more dish identifiers in the reference set as one or more variant dish identifiers of the first candidate theme may be based on at least one of a predetermined threshold for association scores and a predetermined number of dish identifiers to select. For example, the processor 102 may be configured to only select dish identifier(s) having association score(s) over a predetermined threshold, or to only select the four dish identifier(s) having the top four highest associated scores amongst all of the dish identifiers in the references set, or to only select the four dish identifier(s) having the top four highest associated scores amongst all of the dish identifiers in the reference sets given that the four dish identifier(s) all have association scores over a predetermined threshold.

Returning to FIG. 2, at block 212, the centroid dish identifier of the first candidate theme and the one or more variant dish identifiers of the first candidate theme are outputted. More specifically, the centroid dish identifier and the one or more variant dish identifiers of the first candidate theme may be outputted via the user interface 104 (e.g. a display screen) of the apparatus 100 under control of the processor 102.

In some embodiments, outputting the centroid dish identifier of the first candidate theme and the one or more variant dish identifiers of the first candidate theme at block 212 may comprise: displaying the first candidate theme and displaying, upon receiving a user input to expand the first candidate theme, the centroid dish identifier of the first candidate theme and the one or more variant dish identifiers of the first candidate theme. In these embodiments, the centroid dish identifier of the first candidate theme may be displayed above the one or more variant dish identifiers of the first candidate theme. Moreover, in these embodiments, the one or more variant dish identifiers of the first candidate theme may be displayed in descending order of their respective association scores.

Although not illustrated in FIG. 2, in some embodiments the method may further comprise analyzing the first image acquired at block 202 using a predictive model to determine one or more additional candidate themes, and outputting the one or more additional candidate themes. Each of the additional candidate themes may comprise a plurality of candidate dish identifiers each associated with a candidate dish. Moreover, for each of the additional candidate themes, one of the candidate dish identifiers may be a centroid dish identifier most representative of the respective candidate theme. In these embodiments, the predictive model used for determining one or more additional candidate themes may be the same predictive model used for determining the first candidate theme at block 204. In some embodiments, the processor 102 of the apparatus 100 may be configured to determine a predetermined number of additional candidate themes or a predetermined maximum number of additional candidate themes.

Figure 3A:
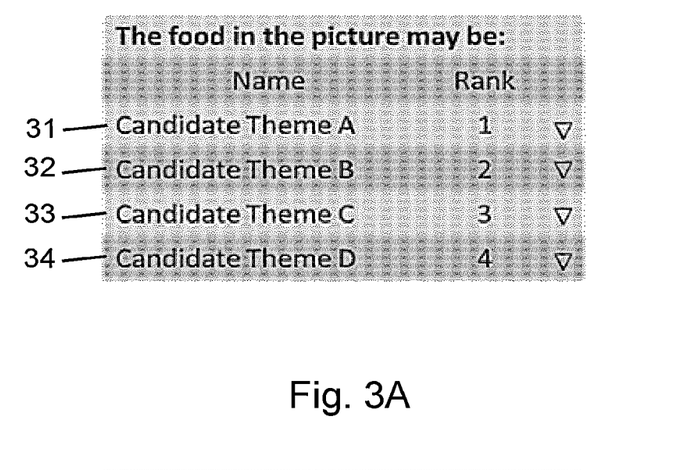
FIG. 3A illustrates an example of a first candidate theme and a plurality of additional candidate themes being outputted at a display in a first state, according to an embodiment.
Figure 3B:
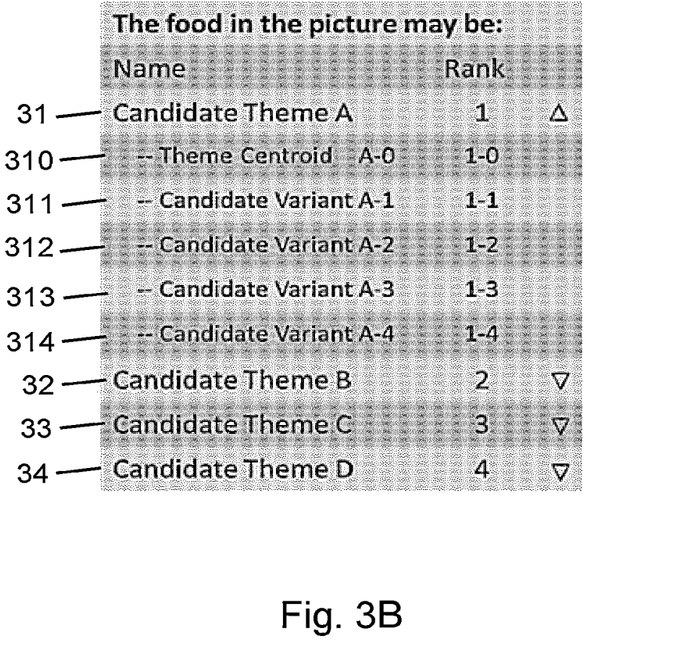
FIG. 3B illustrates the first candidate theme and the plurality of additional candidate themes of FIG. 3A being outputted at a display in a second state.

In some embodiments, outputting each of the one or more additional candidate themes may comprise outputting the centroid dish identifier of the respective additional candidate theme and the one or more variant dish identifiers of the respective additional candidate theme. In some embodiments, outputting each of the one or more additional candidate themes may comprise displaying the respective additional candidate theme and displaying, upon receiving a user input to expand the respective additional candidate theme, the centroid dish identifier of the respective additional candidate theme and the one or more variant dish identifiers of the respective additional candidate theme. An example of the first candidate theme being outputted with the one or more additional candidate themes is illustrated in FIG. 3A and FIG. 3B.

In some embodiments where the method comprises analyzing the first image using a predictive model to determine one or more additional candidate themes, the method may further comprise performing the following steps for each of the one or more additional candidate themes: calculating, for each of the dish identifiers in the reference set, an association score indicative of a degree of similarity between the dish represented by the respective dish identifier and the respective additional candidate theme; selecting one or more dish identifiers in the reference set having the highest association scores as one or more variant dish identifiers of the respective additional candidate theme; and outputting the centroid dish identifier of the respective additional candidate theme and the one or more variant dish identifiers of the respective additional candidate theme. In these embodiments, the association score for each of the dish identifiers in the reference set may be calculated based on cosine similarity metrics.

Although not illustrated in FIG. 2, in some embodiments the method may further comprise determining a ranking of the first candidate theme and the one or more additional candidate themes using the predictive model. In these embodiments, the ranking may be indicative of a descending degree of similarity between the centroid dish of the respective candidate theme and the depicted dish in the first image acquired at block 202. Moreover, in these embodiments, the method may further comprise displaying the first candidate theme and the one or more additional candidate themes base on the determined ranking. An example of the determined ranking of the first candidate theme and the one or more additional candidate themes is illustrated in FIG. 3A and FIG. 3B.

Although not illustrated in FIG. 2, in some embodiment the method may further comprise acquiring a plurality of recipes. Each of the plurality of recipes comprises: a dish identifier, a plurality of food ingredients, and one or more cooking instructions. The dish identifiers, the plurality of food ingredients, and the one or more cooking instructions may be provided and/or stored (e.g. in memory 106) in marked or unmarked format. Examples of marked formats include Extensible Markup Language (XML) and JavaScript Object Notation (JSON), and examples of unmarked formats include delimited plain text, regular expressions, and spreadsheets.

Following the step of acquiring the plurality of recipes, the method may also further comprise selecting a core subset of recipes from the acquired plurality of recipes, and calculating a similarity score between each of the recipes in the core subset based on at least one of: a degree of similarity between the dish identifiers of the two recipes, a degree of similarity between the food ingredient of the two recipes, and a degree of similarity between the cooking instructions of the two recipes. Subsequently, the method may comprise clustering the plurality of recipes into a plurality of reference themes based on the similarity scores of the plurality of recipes, and selecting, for each of the plurality of reference themes, a centroid recipe. The dish identifier of the selected recipe is the centroid dish identifier of the respective reference theme. The recipe selection in this regard may be performed such that the recipe having the highest cosine similarity with the averaged center of the respective reference theme is selected as the centroid recipe. Alternatively, the recipe selection may be performed such that the recipe having the smallest proximity distance with the averaged center of the respective reference theme is selected as the centroid recipe. Moreover, in these embodiments, determining a first candidate theme at block 204 may comprise selecting the first candidate theme from the plurality of reference themes.

In these embodiments, calculation of similarity scores between each of the recipes in the core subset may be based on cosine similarity metrics. Each of the plurality of recipes acquired may be represented by a vector, the vector being determined (e.g. by the processor 102 of the apparatus 100) based on a relevant occurrence frequency of one or more semantic keywords (e.g. dish identifier of the recipe and its aliases/synonyms, food ingredients, and instructions) in the recipe. The similarity score between two recipes in the plurality of recipes may be represented by an angle between the two vectors corresponding to the two recipes. In these embodiments, the calculated similarity score between each of the recipes in the core subset may be adjusted for irrelevant generic association. Also, in these embodiments, the calculation of the similarity score may be at least based on a degree of similarity of food ingredients of the two recipes. In this case, the calculated similarity score between each of the recipes in the core subset may be adjusted for the proportions of food ingredients in the total weight of the recipe (vectorized and proportion weighted term frequency-inverse document frequency measure).

By way of example, as described with reference to FIG. 1, the plurality of recipes may be acquired from a recipe database. In this example, the recipe database may comprise recipes associated with a plurality of dishes N, and each of the dishes n is associated with a respective structured text description that is composed of L(n) terms. From this recipe database, a total number of terms (or keywords) M can be extracted. For each of the dishes n in the N dishes, the occurrence count of a term m is f(n,m), and therefore the fractional term frequency of term m in dish n is f(n,m)/L(n). The term m also occurs in the structured text description of N'(m) dishes, where repetition within the structured text description associated with a single dish is not counted. The fractional document frequency of term m is therefore N'(m)/N. The relevant term frequency T(n,m) (i.e. "term frequency-inversed document frequency (TF-IDF)") can be therefore be adjusted for document frequency from the original fractional term frequency according to the formula below:

$$T(n, m) = \frac{f(n, m)}{L(n)} \times \log \frac{N}{Nr(m)} \quad (1)$$

As such, each dish n has a term vector with TF-IDF values and a length of M.

The cosine similarity value between the term vectors of any two dishes $n_1$, $n_2$ can be determined using the formula below:

$$\cos(n_1, n_2) = \frac{\sum_{m=1}^{M} [w_m^2 \times T(n_1, m) \times T(n_2, m)]}{\sqrt{\sum_{m=1}^{M} w_m^2 \times T^2(n_1, m)} \times \sqrt{\sum_{m=1}^{M} w_m^2 \times T^2(n_2, m)}} \quad (2)$$

where $w_m$ represents the importance weighing of the term, according to, for instance, the proportions of food ingredients in the total weight of the recipe. In this case, the closer the two vectors are to each other, higher the cosine similarity value will be.

In these embodiments, selecting the recipe having the highest cosine similarity with the respective reference theme as the centroid recipe may be based on at least one of a similarity measure and a proximity distance measure. For example, the recipe with a maximal similarity measure (i.e. minimal angle between the vector representing the recipe and the vector of the respective reference theme) may be selected as the centroid recipe. As another example, the recipe with a minimal proximity distance measure may be selected as the centroid recipe. The proximity distance measure may be represented by a proximity value D. In more detail, the proximity value $D(n_1, n_2)$ between the term vectors of any two dishes $n_1$, $n_2$ (associated with respective recipes) may be determined using the formula below:

$$D(n_1, n_2) = \sqrt{\sum_{m=1}^{M} w_m^2 \times [T(n_1, m) - T(n_2, m)]^2} \quad (3)$$

The proximity value is opposite to the cosine similarity value, i.e. the closer the two vectors are to each other, the smaller the proximity value will be.

Furthermore, in these embodiments, the method may further comprise determining a popularity score for each of the plurality of recipes. The popularity score of a recipe may be indicative of a popularity or commonness of the recipe. For example, the popularity score of a recipe may be determined based on a count of search results returned of the full name of the respective dish at an Internet search engine or a cooking website or a food/meal order service website. In these embodiments, selecting the core subset of recipes may be based on the popularity scores of the plurality of recipes. For example, the core subset of recipes may comprise recipes having popularity scores higher than a predetermined threshold. As another example, the core subset of recipes may comprise a predetermined number of recipes having the highest popularity scores (e.g. top 200 highest popularity scores).

In some embodiments, the plurality of recipes may be acquired by the processor 102 of the apparatus 100. In addition, in some embodiments, the plurality of recipes may be acquired from a recipe database. For example, a structured recipe database may be stored in the memory 106 of the apparatus 100 and the processor 102 may acquire the plurality of recipes from the memory 106. The recipe database may be configured such that new recipes can be introduced to continuously expand the recipe database. Furthermore, as mentioned above, in these embodiments acquiring the reference set of dish identifiers at block 206 may comprise extracting dish identifiers from the acquired plurality of recipes.

As mentioned above, in some embodiments the method may further comprise calculating a similarity score between each of the recipes in the core subset. In these embodiments, the calculation of the similarity score between each of the recipes in the core subset may be based on one or more synonyms of at least one of: the dish identifiers, the plurality of food ingredients, and the cooking instructions of the two recipes. The one or more synonyms of at least one of: the dish identifiers, the plurality of food ingredients, and the cooking instructions of the recipes may be acquired from a synonym dictionary stored in the memory 106 or retrieved by the processor 102. The synonym dictionary may include synonyms of cooking terms such as food ingredients, feature flavors, cooking methods, and cooking styles, etc.

In some embodiments, each of the plurality of recipes acquired may comprise, in addition to a dish identifier (referred to herein as "original dish identifier"), one or more equivalent dish identifiers. The one or more equivalent dish identifiers may be synonyms of the original dish identifier, since a particular dish may adopt different names depending on different factors such as region. For example, a recipe having an original dish identifier "cheese omelet" may have equivalent dish identifiers such as "cheese omelette" and "omelette du fromage". In these embodiments, the calculation of the similarity score between each of the recipes in the core subset may be based on the original dish identifier(s) and at least one of the equivalent dish identifier(s).

As mentioned above, in some embodiments the method may further comprise clustering the plurality of recipes into a plurality of reference themes. In more detail, recipes with low covariance or high similarity with each other (indicated by the similarity scores) may be clustered into a plurality of reference themes. In these embodiments, the clustering process may be based on K-means clustering or singular value decomposition.

Although not illustrated in FIG. 2, the method may further comprise determining, for each of the plurality of reference themes, a plurality of keywords based on the recipes of the respective reference themes. In these embodiments, each of the plurality of keywords may be associated with at least one of a cooking technique and a food ingredient. The plurality of keywords may be extracted from the recipe associated with the centroid dish of the selected reference theme.

As mentioned above, in some embodiments the method may further comprise clustering the plurality of recipes into a plurality of reference themes. In these embodiments, the method may further comprise selecting one of the plurality of reference themes, acquiring a second image based on at least one of the centroid dish identifier of the selected reference theme and the plurality of keywords of the selected reference theme, and training the predictive model based on the second image and the selected reference theme. In these embodiments, the predictive model may be trained on the basis of using the selected reference theme as the labelled ground truth. The predictive model may also be further validated based on the second image and the selected reference theme. It will be appreciated that more than one second images can be acquired based on at least one of the centroid dish identifier of the selected reference theme and the plurality of keywords of the selected reference theme, and training the predictive model may be based on more than one of these second images and the selected reference theme.

In these embodiments, acquiring the second image may comprise retrieving the second image based on image search at an Internet search engine using at least one of the plurality of keywords and/or the centroid dish identifier of the selected reference theme. For example, the second image may an image with a high correlation to the centroid dish identifier as the search keyword. In this case, the second image would increase intra-theme diversity in training the predictive model. Additionally, the search may be conducted with a proper inclusiveness. For example, a full term matching of a single keyword or a combination of different keywords may be used. In more detail, in the case of Chinese text, a keyword may consist of more than one Chinese characters with no delimiter. In this case, a full term match refers to matching of the whole keyword (i.e. every Chinese character in the keyword) and not merely a part of the keyword (i.e. only some Chinese characters in the keyword).

Although not illustrated in FIG. 2, the method may further comprise receiving a user input selecting a dish identifier. In some embodiments, the user may be able to select from the outputted centroid dish identifier and the one or more variant dish identifiers of the first candidate theme. Also, in embodiments where the candidate theme and the one or more variant dish identifiers are outputted for one or more additional candidate themes, the user may be able to select from these outputted dish identifiers. The dish identifier selected by the user may be stored (e.g. in the memory 106 of the apparatus 100) for diet analysis purposes and/or historical record of the diet of the user.

FIG. 3A and FIG. 3B illustrate a first candidate theme and a plurality of additional candidate themes being outputted at a display in a first state and in a second state respectively, according to an embodiment.

This output illustrated in FIG. 3A and FIG. 3B can be performed at the user interface 104 of the apparatus 100 of FIG. 1. In more detail, this output can be performed after the first candidate theme and the plurality of additional candidate themes have been determined by the processor 102, the association scores of each of the dish identifiers in the reference set with each of the candidate themes have been calculated, the variant dish identifier(s) have been selected for each of the first candidate theme and the plurality of additional candidate themes, and the ranking of the first candidate theme and the plurality of additional candidate themes is determined. In this embodiment, the ranking is indicative of a descending degree of similarity between the centroid dish of the respective candidate theme and the depicted dish in the first image.

As shown in FIG. 3A, in the first state, the first candidate theme 31 ("Candidate Theme A") is displayed along with the three additional candidate themes 32, 33, 34 ("Candidate Theme B", "Candidate Theme C", and "Candidate Theme D") along with their respective determined rankings. Furthermore, the candidate themes are displayed in descending order of the respective determined rankings of the candidate themes. FIG. 3A may be considered as an example of an initial output stage of the candidate themes 31, 32, 33, 34.

Upon receiving a user input to expand any one of the candidate themes 31, 32, 33, 34 (e.g. via the user interface 104), the centroid dish identifier of the candidate theme and the one or more variant dish identifiers of the candidate theme are also displayed. In this embodiment, a user may select one of the candidate themes to expand by clicking inverted triangle icon corresponding to the respective candidate theme.

An example of this is illustrated in FIG. 3B after the first candidate theme 31 is selected by a user to expand, thus initiating transition from the first state to the second state. Upon receiving this particular user input, the centroid dish identifier 310 of the first candidate theme 31 as well as a first variant dish identifier 311, a second variant dish identifier 312, a third variant dish identifier 313, and a fourth variant dish identifier 314 are displayed below the candidate theme identifier of the first candidate theme 31. More specifically, the centroid dish identifier 310 is displayed above the variant dish identifiers 311, 312, 313, 314 (as the default option of the candidate theme). Moreover, in this embodiment, the first to fourth variant dish identifiers 311, 312, 313, 314 of the first candidate theme 31 are be displayed in descending order of their respective association scores.

In this way, a two-level format of the results from the image-based dish recognition can be presented to the user. Specifically, the user is provided with an overview of the candidate themes for the first image depicting a dish to be recognized in the first state, while being provided with an option to view the centroid dish and the variant dishes of the candidate theme if desired. In this embodiment, it may also be possible to return from the second state to the first state by way of clicking the triangle icon corresponding to the expanded candidate theme so as to "minimize" the candidate theme.

There is thus provided an improved method and apparatus for performing image-based dish recognition, which overcomes the existing problems.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for performing image-based dish recognition, the method comprising:
acquiring a first image depicting a dish to be recognized;

acquiring a plurality of recipes, wherein each of the plurality of recipes comprises: a dish identifier, a plurality of food ingredients, and one or more cooking instructions;

selecting a core subset of recipes, from the acquired plurality of recipes;

calculating a similarity score between each of the recipes in the core subset based on at least one of: a degree of similarity between the dish identifiers of the two recipes, a degree of similarity between the food ingredients of the two recipes, and a degree of similarity between the cooking instructions of the two recipes;

clustering the plurality of recipes into a plurality of reference themes based on the similarity scores of the plurality of recipes; and selecting, for each of the plurality of reference themes, the recipe having the highest cosine similarity with the respective reference theme as the centroid recipe, wherein the dish identifier of the selected recipe is the centroid dish identifier of the respective reference theme;

analyzing the first image using a predictive model to determine a first candidate theme, wherein the first candidate theme comprises a plurality of candidate dish identifiers each associated with a candidate dish, one of the plurality of candidate dish identifiers being a centroid dish identifier associated with a candidate dish most representative of the first candidate theme, and wherein determining a first candidate theme comprises selecting the first candidate theme from the plurality of reference themes;

acquiring a reference set of dish identifiers from the plurality of acquired recipes;

calculating, for each of the dish identifiers in the reference set, an association score indicative of a degree of similarity between the dish represented by the respective dish identifier and the first candidate theme based on a proximity distance between a vector representing the respective dish identifier in the reference set and a vector representing the first candidate theme, or based on an angle between a vector representing the respective dish identifier in the reference set and a vector representing the first candidate theme, wherein the vectors are results of cluster analysis;

selecting one or more dish identifiers in the reference set having the highest association scores as one or more variant dish identifiers of the first candidate theme; and outputting the centroid dish identifier of the first candidate theme and the one or more variant dish identifiers of the first candidate theme.

2. The computer-implemented method of claim 1, wherein outputting the centroid dish identifier of the first candidate theme and the one or more variant dish identifiers of the first candidate theme comprises:

displaying the first candidate theme; and displaying, upon receiving a user input to expand the first candidate theme, the centroid dish identifier of the first candidate theme and the one or more variant dish identifiers of the first candidate theme, wherein the centroid dish identifier of the first candidate theme is displayed above the one or more variant dish identifiers of the first candidate theme, and the one or more variant dish identifiers of the first candidate theme are displayed in descending order of their respective association scores.

3. The computer-implemented method of claim 1, wherein the plurality of candidate dish identifiers in the first candidate theme represent dishes that are similar to each other.

4. The computer-implemented method of claim 1, further comprising:

analyzing the first image using the predictive model to determine one or more additional candidate themes, wherein each of the additional candidate themes comprises a plurality of candidate dish identifiers each associated with a candidate dish, one of the plurality of candidate dish identifiers being a centroid dish identifier most representative of the respective candidate theme; and outputting the one or more additional candidate themes.

5. The computer-implemented method of claim 4, further comprising, for each of the one or more additional candidate themes:

calculating, for each of the dish identifiers in the reference set, an association score indicative of a degree of similarity between the dish represented by the respective dish identifier and the respective additional candidate theme;

selecting one or more dish identifiers in the reference set having the highest association scores as one or more variant dish identifiers of the respective additional candidate theme; and outputting the centroid dish identifier of the respective additional candidate theme and the one or more variant dish identifiers of the respective additional candidate theme.

6. The computer-implemented method of claim 4, further comprising:

determining a ranking of the first candidate theme and the one or more additional candidate themes using the predictive model, wherein the ranking is indicative of a descending degree of similarity between a centroid dish of the respective candidate theme and the depicted dish in the acquired first image; and displaying the first candidate theme and the one or more additional candidate themes based on the determined ranking.

7. The computer-implemented method of claim 1, further comprising:

determining a popularity score for each of the plurality of recipes, wherein the popularity score is indicative of a popularity or commonness of the respective recipe, wherein selecting the core subset of recipes is based on the popularity scores of the plurality of recipes.

8. The computer-implemented method of claim 1, wherein calculating the similarity score between each of the recipes in the core subset is based on one or more synonyms of at least one of: the dish identifiers, the plurality of food ingredients, and the cooking instructions of the two recipes.

9. The computer-implemented method of claim 1, wherein clustering the plurality of recipes into the plurality of reference themes is based on K-means clustering or singular value decomposition.

10. The computer-implemented method of claim 1, further comprising:

determining, for each of the plurality of reference themes, a plurality of keywords based on the recipes of the respective reference themes, wherein each of the plurality of keywords is associated with at least one of a cooking technique and a food ingredient.

11. The computer-implemented method of claim 10, further comprising:

selecting one of the plurality of reference themes;
acquiring a second image based on at least one of the centroid dish identifier of the selected reference theme and the plurality of keywords of the selected reference theme; and
training the predictive model based on the second image and the selected reference theme.

12. The computer-implemented method of claim 1, wherein the predictive model is at least one of: a convolutional neural network, a residual neural network, and a dense neural network.

13. A computer program product comprising a non-transitory computer readable medium, the computer readable medium having computer readable code embodied therein, the computer readable code being configured such that, on execution by a suitable computer or processor, the computer or processor is caused to perform a method comprising:
acquiring a first image depicting a dish to be recognized;
acquiring a plurality of recipes, wherein each of the plurality of recipes comprises: a dish identifier, a plurality of food ingredients, and one or more cooking instructions;
selecting a core subset of recipes from the acquired plurality of recipes;
calculating a similarity score between each of the recipes in the core subset based on at least one of: a degree of similarity between the dish identifiers of the two recipes, a degree of similarity between the food ingredients of the two recipes, and a degree of similarity between the cooking instructions of the two recipes;
clustering the plurality of recipes into a plurality of reference themes based on the similarity scores of the plurality of recipes; and
selecting, for each of the plurality of reference themes, the recipe having the highest cosine similarity with the respective reference theme as the centroid recipe, wherein the dish identifier of the selected recipe is the centroid dish identifier of the respective reference theme;
analyzing the first image using a predictive model to determine a first candidate theme, wherein the first candidate theme comprises a plurality of candidate dish identifiers each associated with a candidate dish, one of the plurality of candidate dish identifiers being a centroid dish identifier associated with a candidate dish most representative of the first candidate theme, and wherein determining the first candidate theme comprises selecting the first candidate theme from the plurality of reference themes;
acquiring a reference set of dish identifiers;
calculating, for each of the dish identifiers in the reference set, an association score indicative of a degree of similarity between the dish represented by the respective dish identifier and the first candidate theme based on a proximity distance between a vector representing the respective dish identifier in the reference set and a vector representing the first candidate theme, or based on an angle between a vector representing the respective dish identifier in the reference set and a vector representing the first candidate theme, wherein the vectors are results of cluster analysis;
selecting one or more dish identifiers in the reference set having the highest association scores as one or more variant dish identifiers of the first candidate theme; and
outputting the centroid dish identifier of the first candidate theme and the one or more variant dish identifiers of the first candidate theme.

14. An apparatus for performing image-based dish recognition, the apparatus comprising a processor configured to:
acquire a first image depicting a dish to be recognized;
acquire a plurality of recipes, wherein each of the plurality of recipes comprises: a dish identifier, a plurality of food ingredients, and one or more cooking instructions;
select a core subset of recipes from the acquired plurality of recipes;
calculate a similarity score between each of the recipes in the core subset based on at least one of: a degree of similarity between the dish identifiers of the two recipes, a degree of similarity between the food ingredients of the two recipes, and a degree of similarity between the cooking instructions of the two recipes;
cluster the plurality of recipes into a plurality of reference themes based on the similarity scores of the plurality of recipes;
select, for each of the plurality of reference themes, the recipe having the highest cosine similarity with the respective reference theme as the centroid recipe, wherein the dish identifier of the selected recipe is the centroid dish identifier of the respective reference theme;
analyze the first image using a predictive model to determine a first candidate theme, wherein the first candidate theme comprises a plurality of candidate dish identifiers each associated with a candidate dish, one of the plurality of candidate dish identifiers being a centroid dish identifier associated with a candidate dish most representative of the first candidate theme, and wherein determining a first candidate theme comprises selecting the first candidate theme from the plurality of reference themes;
acquire a reference set of dish identifiers;
calculate, for each of the dish identifiers in the reference set, an association score indicative of a degree of similarity between the dish represented by the respective dish identifier and the first candidate theme based on a proximity distance between a vector representing the respective dish identifier in the reference set and a vector representing the first candidate theme, or based on an angle between a vector representing the respective dish identifier in the reference set and a vector representing the first candidate theme, wherein the vectors are results of cluster analysis;
select one or more dish identifiers in the reference set having the highest association scores as one or more variant dish identifiers of the first candidate theme; and
output the centroid dish identifier of the first candidate theme and the one or more variant dish identifiers of the first candidate theme.

15. The computer-implemented method of claim 1, further comprising:
determining a vector for each of the dish identifiers in the reference set based on a relevance occurrence frequency of one or more semantic keywords in a recipe associated with the respective dish identifier.

16. The computer-implemented method of claim 15, further comprising:
determining the vector for the first candidate theme based on a relevance occurrence frequency of the one or more semantic keywords in recipes associated with the plurality of candidate dish identifiers of the first candidate theme; or determining the vector for the first candidate theme based on a relevance occurrence frequency of the one or more semantic keywords in a recipe associated with the centroid dish identifier of the first candidate theme.

17. The computer-implemented method of claim 1, wherein selecting the one or more dish identifiers in the reference set as the one or more variant dish identifiers of the first candidate theme is based on at least one of: a predetermined threshold for the association scores, and a predetermined number of dish identifiers in the reference set to select.

* * * * *